(12) United States Patent
Berkowitz et al.

(10) Patent No.: US 7,366,858 B2
(45) Date of Patent: *Apr. 29, 2008

(54) FRAMEWORK FOR TAKING SHADOW COPIES AND PERFORMING BACKUPS IN A NETWORKED ENVIRONMENT

(75) Inventors: Brian T. Berkowitz, Seattle, WA (US); Catharine van Ingen, Bellevue, WA (US); Paul Adrian Oltean, Redmond, WA (US); Ran Kalach, Bellevue, WA (US); Reuven L. Lax, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 503 days.

This patent is subject to a terminal disclaimer.

(21) Appl. No.: 10/939,189

(22) Filed: Sep. 9, 2004

(65) Prior Publication Data
US 2006/0053259 A1 Mar. 9, 2006

(51) Int. Cl.
*G06F 12/16* (2006.01)
(52) U.S. Cl. ............... 711/162; 711/170; 711/112; 714/6
(58) Field of Classification Search .......... 711/162, 711/165, 170, 171, 172, 202; 714/4, 5, 6
See application file for complete search history.

(56) References Cited

U.S. PATENT DOCUMENTS

| | | | | |
|---|---|---|---|---|
| 6,014,669 A | * | 1/2000 | Slaughter et al. ........... | 707/10 |
| 7,120,769 B2 | * | 10/2006 | Yagawa et al. ............. | 711/162 |
| 7,254,682 B1 | * | 8/2007 | Arbon ........................ | 711/161 |
| 2003/0149736 A1 | * | 8/2003 | Berkowitz et al. .......... | 711/162 |
| 2004/0254936 A1 | * | 12/2004 | Mohamed ................... | 707/10 |

OTHER PUBLICATIONS

Ananda Sankaran et al.; "Volume Shadow Copy Serivce"; Power Solutions Mar. 2004; pp. 14, 16-18.*
IEEE publication, "Overview of Disaster Recovery for Transaction Processing System" by Richard King et al., IBM T.J. Watson Research Center, Yorktown Heights, pp. 286-293 Jun. 1990.*

* cited by examiner

*Primary Examiner*—Pierre-Michel Bataille
(74) *Attorney, Agent, or Firm*—Workman Nydegger

(57) ABSTRACT

A framework for taking shadow copies and performing backups in systems that may have data spread across multiple machines. A requester communicates names to a primary coordinator and requests the creation of shadow copies of all the volumes associated with the names. The primary coordinator communicates with one or more writers and one or more secondary coordinators to create the shadow copies of the volumes. The primary and one or more secondary coordinators create shadow copies of one or more of the volumes that reside on the machines upon which they execute. After the shadow copies of the volumes have been created, the requester may obtain data from the shadow copies and create a consistent backup.

38 Claims, 9 Drawing Sheets

FIG. 9
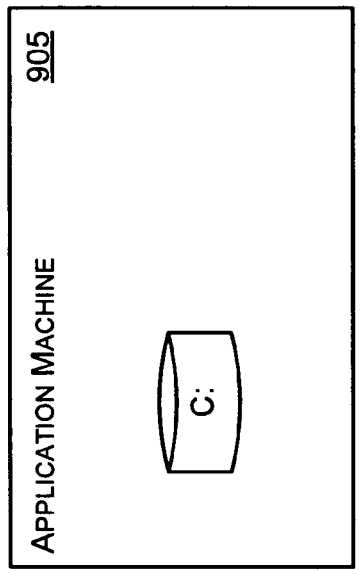
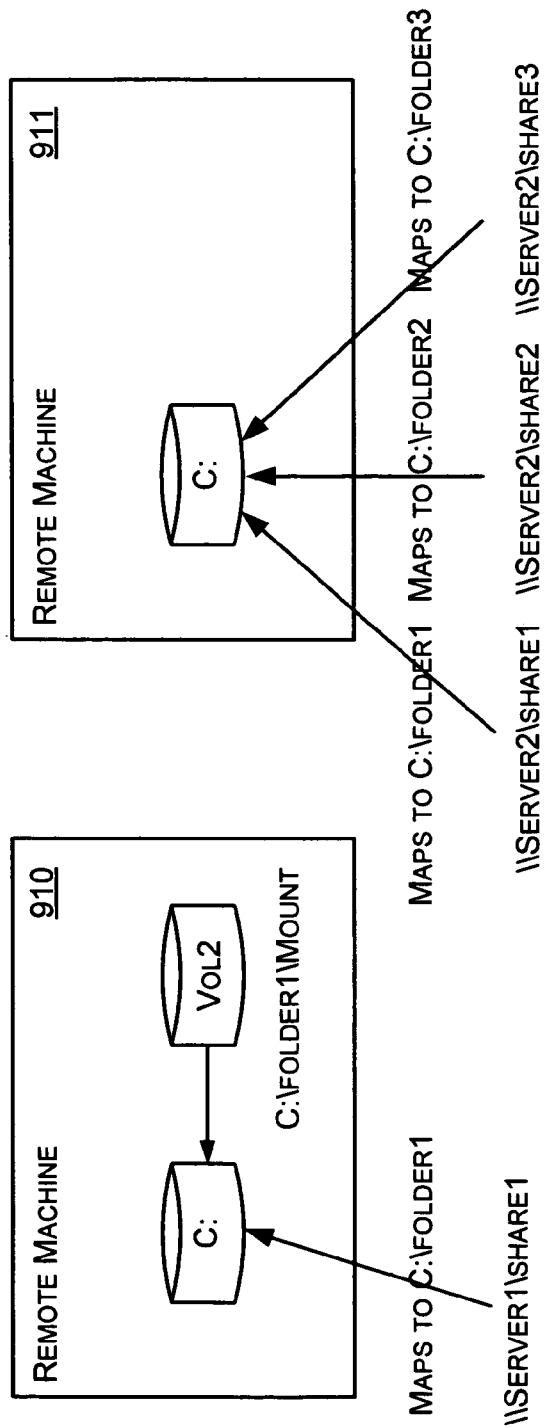

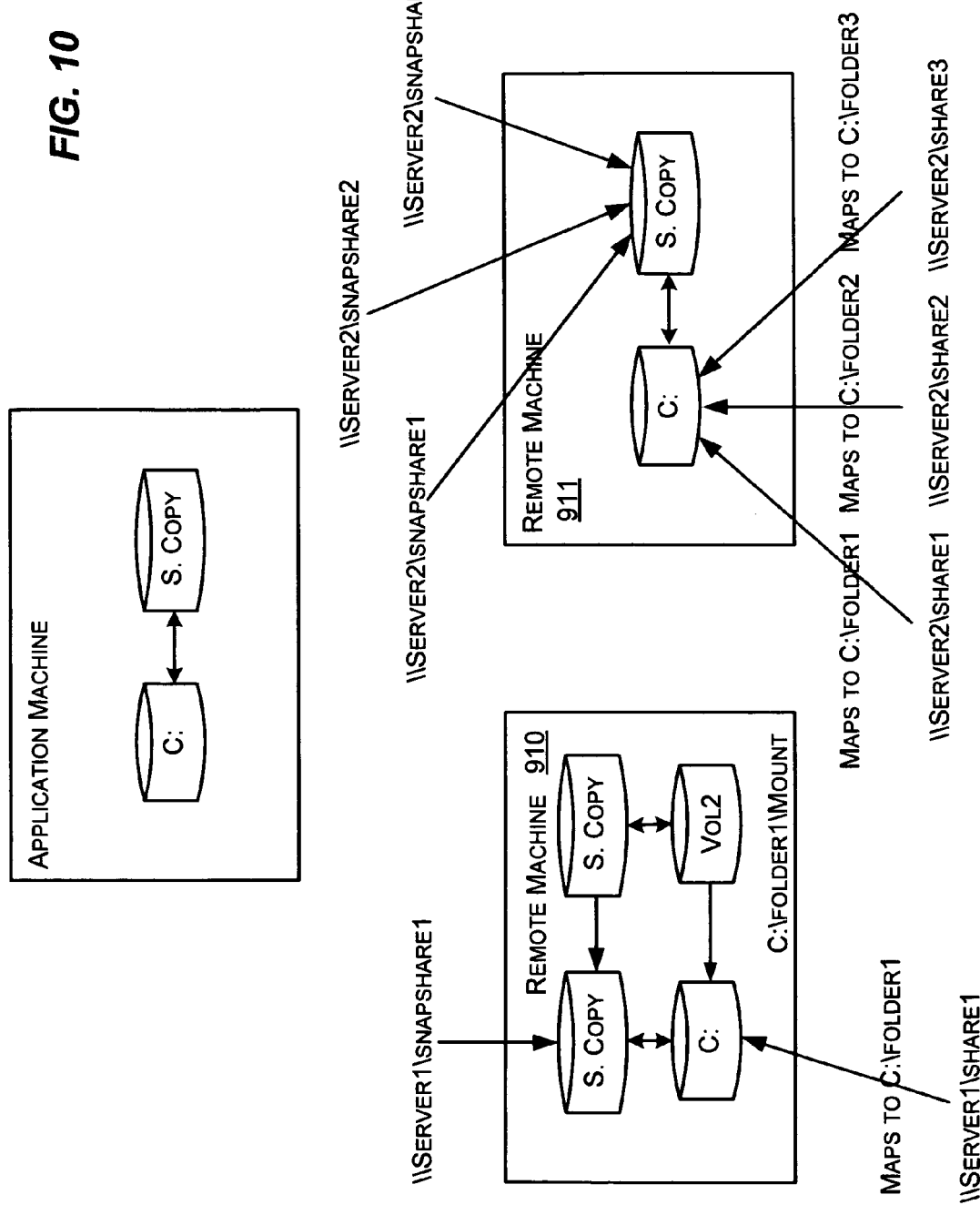

FRAMEWORK FOR TAKING SHADOW COPIES AND PERFORMING BACKUPS IN A NETWORKED ENVIRONMENT

FIELD OF THE INVENTION

The invention relates generally to computers, and more particularly to backups and restores of storage.

BACKGROUND

In today's computing environment, it is becoming more and more common to have an application that executes on one machine while storing some data on the machine on which the application is executing and other data related to the application on one or more other machines. For example, an e-mail server for a large company may execute and store some of its configuration data on one machine while storing data related to e-mails on a group of other machines. With the critical nature of this and other types of data, it is very important that the data is backed up frequently.

Furthermore, as the world becomes more information-driven, it is becoming more and more expensive to block access for any significant period of time to a machine or group of machines in order to create a backup. The data involved in a backup may amount to many gigabytes or terabytes and may involve many machines. Even with fast backup machines, backing up this amount of data often creates unacceptable down time or inconsistent backups with current methods.

What is needed is a framework for backing up systems that may have data spread across multiple machines. Ideally, such a framework would lend itself to backing up the data with minimal impact to the other users and applications attempting to use the machines.

SUMMARY

Briefly, the present invention provides a framework for taking shadow copies and performing backups in systems that may have data spread across multiple machines. A requester communicates names to a primary coordinator and requests the creation of shadow copies of all the volumes associated with the names. The primary coordinator communicates with one or more writers and one or more secondary coordinators to create the shadow copies of the volumes. The primary and one or more secondary coordinators create shadow copies of one or more of the volumes that reside on the machines upon which they execute. After the shadow copies of the volumes have been created, the requester may obtain data from the shadow copies and create a consistent backup.

Other aspects will become apparent from the following detailed description when taken in conjunction with the drawings, in which:

BRIEF DESCRIPTION OF THE DRAWINGS

FIGS. 9-10 are block diagrams that generally represent configurations that may occur before and after an exemplary creation of shadow copies of volumes included in a shadow copy set in accordance with various aspects of the invention.

DETAILED DESCRIPTION

Exemplary Operating Environment

Figure 1:
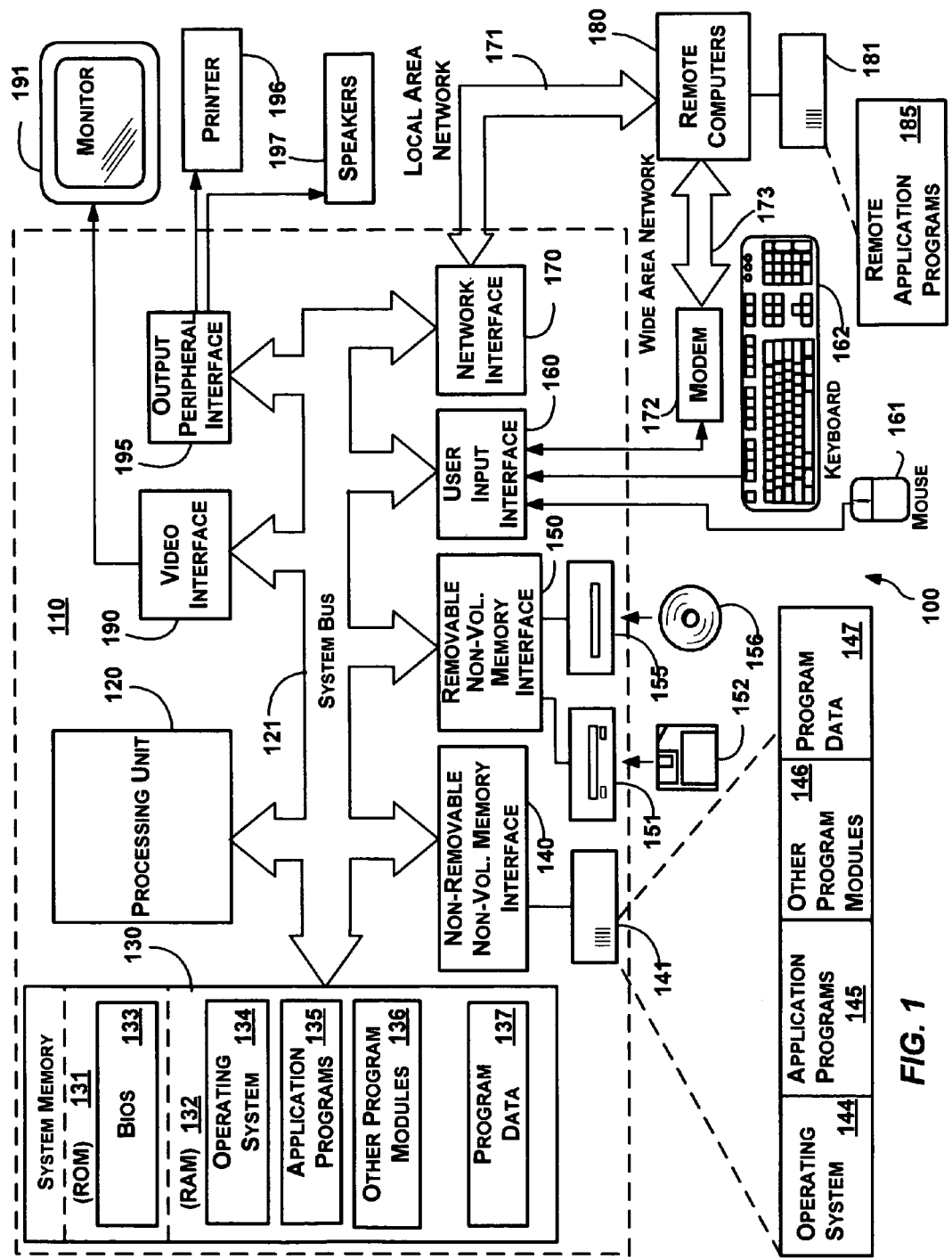
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, Figure 1 illustrates remote application programs 185 as residing on memory device 181. It will be appreciated that the network connections shown are exemplary and other means of establishing a communications link between the computers may be used.

Framework for Creating a Shadow Copy Set

Figure 2:
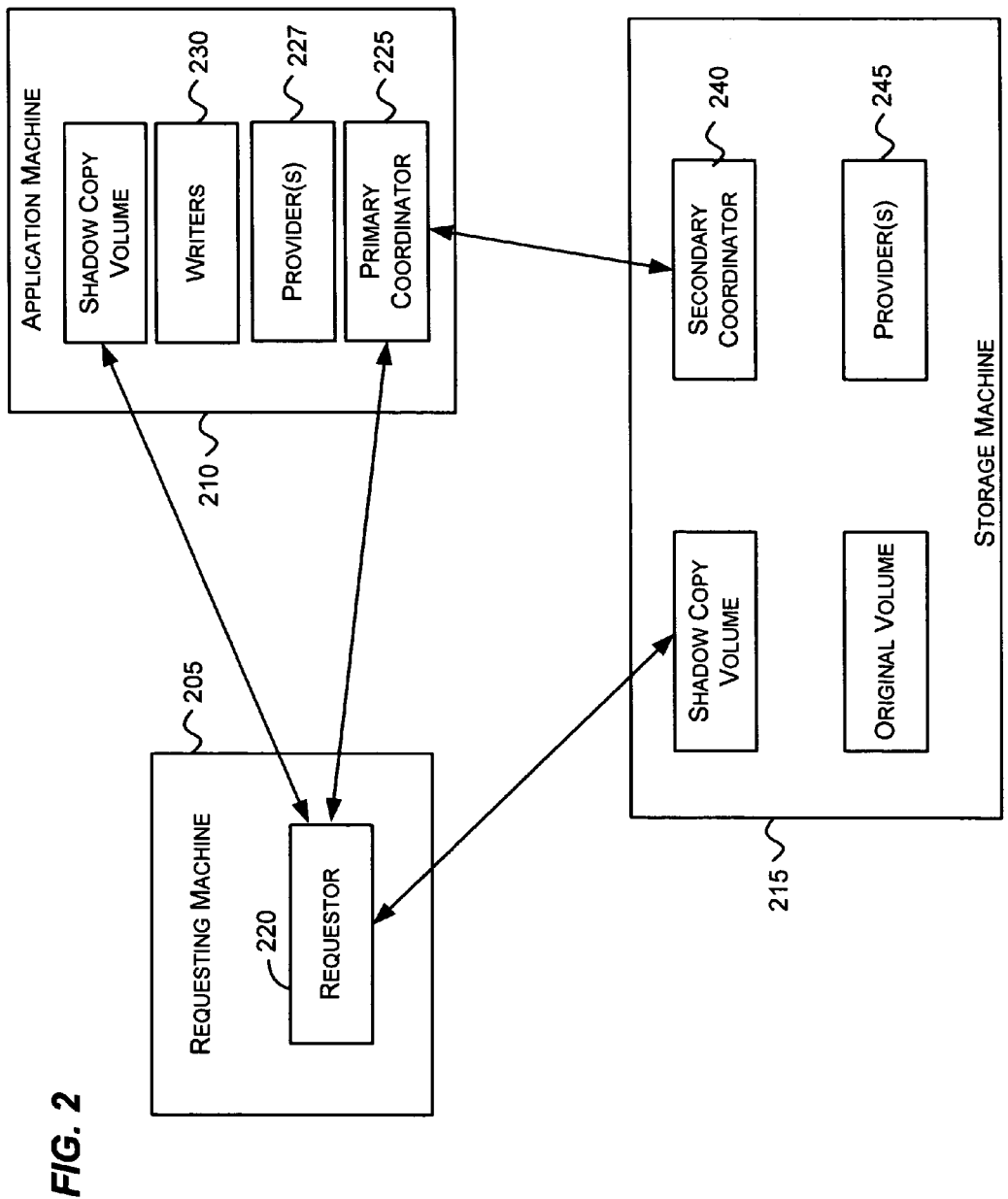
FIG. 2 is a block diagram representing an exemplary configuration in which the invention may be practiced in accordance with various aspects of the invention.

FIG. 2 is a block diagram representing an exemplary configuration in which the invention may be practiced in accordance with various aspects of the invention. The configuration includes one or more storage machines 215, a requesting machine 205, and an application machine 210 (hereinafter collectively referred to as "shadow copy participants").

The one or more storage machines 215 are any machines upon which an application may store data and may include any server or other computer having storage including network addressable storage (NAS) devices and the like. FIG. 2 shows one storage machine, but in practice there may be one or more storage machines involved as shadow copy participants.

Each of the shadow copy participants may be implemented using one or more of the components discussed in conjunction with FIG. 1. In some embodiments of the invention, any two of the shadow copy participants may be collocated on one physical machine. In other embodiments of the invention, each of the shadow copy participants is located on a separate machine.

The requesting machine 205 executes an application that includes a requester 220. The requester 220 may initiate the creation of a shadow copy set by communicating with a primary coordinator 225 executing on the application machine 210. After the primary coordinator 225 has caused shadow copies of all volumes involved in the backup to be created, the requester 220 may then access data from the shadow copies (e.g., to create a backup or otherwise).

The primary coordinator 225 executes on the application machine 210 and orchestrates a consistent overall "snapshot" of all of the volumes involved in a shadow copy set by communicating with one or more secondary coordinators (e.g., secondary coordinator 240), one or more writers (e.g., writers 230), and one or more local providers (e.g., local providers 227) as described in more detail below.

Logically, a shadow copy set comprises an exact duplicate of each of the volumes in the set at a given point in time, even though the volumes may not be entirely copied (e.g., via copy-on-write) in creating the shadow copy set. Some of the volumes involved in the shadow copy set may be accessed from the machine upon which the primary coordinator 225 executes while other of the volumes or portions thereof may be accessed through the use of network shares as described in further detail below.

The set of volumes that resides on the machine upon which the primary coordinator executes and that needs to be shadow copied will sometimes be referred to as the primary coordinator shadow copy set whereas the set of volumes that reside on a storage machine upon which a secondary coordinator executes and needs to be shadow copied will sometimes be referred to as the secondary coordinator shadow copy set. An overall shadow copy set comprises a union of the primary coordinator shadow set and the one or more secondary coordinator shadow copy sets and may be referred to without the prefix overall.

A writer is a component associated with an application. A writer ensures that at the time a shadow copy set is created what is on disk is consistent as far as the application is concerned. A writer may or may not flush pending writes to disk in preparation for a shadow copy set. The behavior of a writer may depend on the application with which the writer is associated. A writer may also provide information to a backup application as to how to backup and restore the data for the writer's associated application. The writer may tell the backup application where the application's data resides and what files contain the application's data. For example, the writer may report metadata files with a remote path that includes a UNC path or an otherwise named network path as well as a machine local path to a folder on a volume. Having a remote path reported may indicate that to access data the requestor needs to use a remote path.

In addition to and in conjunction with communicating with the writers and secondary coordinators, the primary coordinator 225 may cause shadow copies of one or more volumes that reside on the application machine 210 (i.e., the primary coordinator shadow copy set) to be created. The primary coordinator 225 may cause the shadow copies to be created by preparing and freezing the writers and then instructing the shadow copy provider(s) 227 local to the application machine 210 to create shadow copies.

Each secondary coordinator is in charge of creating one or more shadow copies of volumes located on the machine upon which the secondary coordinator executes (i.e., the secondary coordinator shadow copy set). A shadow copy is a "snapshot" of one volume. Similar to an shadow copy set of multiple volumes, logically, a shadow copy is an exact duplicate of a volume at a given point in time, even though the volume may not be entirely copied (e.g., via copy-on-write) in creating the shadow copy. A shadow copy may be viewed as a separate volume by the operating system and any executing applications. For example, a shadow copy may have a volume device, a volume name, a drive letter, a mount point, and any other attribute of an actual volume. In addition, a shadow copy may be exposed through a network remote path such as a network share (sometimes referred to simply as a "share") associated with it that allows access to a portion or all of the data contained within the shadow copy from a network.

It is important to recognize that a volume or network share may be identified by a name. A name comprises any information that may be used to identify and access storage. Within a machine, a volume name may include a drive letter, a mount point, a symbolic link, a device name (e.g., \\?\GLOBAL ROOT\Device\HarddiskVolume9), and the like. External to a machine, a network remote path may include a network share, a symbolic link, a network file system (NFS) name, a distributed file system (DFS) path, a universal naming convention (UNC) name, and the like. UNC names are a superset of DFS paths and network share names and may identify a network share in the form of \\server\share where "server" identifies the machine upon which "share" is located and "share" maps to a particular directory of a volume located on the machine. A UNC name may also identify a DFS path which may be further translated to identify a machine upon which desired data is located.

A shadow copy mechanism may be implemented by various well-known techniques, including copy-on-write, split mirror, specialized hardware that creates a copy of the disk itself, and other methods and systems known to those skilled in the art. As shadow copy techniques are well known in the art, methods and systems of creating shadow copies will not be described in further detail here.

In creating a shadow copy, a primary or secondary coordinator may communicate with one or more shadow copy providers (e.g., shadow copy provider(s) 227 or 245, respectively). Each shadow copy provider may create a shadow copy using whatever shadow copy technique is supported on the storage device associated with the shadow copy provider. After shadow copies of the volumes of a shadow copy set are created, the requester 220 may obtain data from one or more of the shadow copies from each storage device involved and create, for example, a backup therefrom.

In communicating with a secondary coordinator, the primary coordinator 225 may provide a set of share names rather than a set of volume names. This may be done because the storage machine 215 may expose its data via network shares rather than via volumes. To allow network access to the shadow copies created on the storage machine 215, the storage machine 215 may expose portions or all of the shadow copies as network shares so that a backup application (e.g., requester 220) may access data on the storage machine 215 through the network shares of the shadow copies with a view similar to accessing data from the network shares of the original volume. For example, if a network share of an original volume pointed to a subdirectory of the original volume, the network share created by the secondary coordinator to expose data on a shadow copy of the original volume would point to the corresponding subdirectory of the shadow copy.

Figure 3:
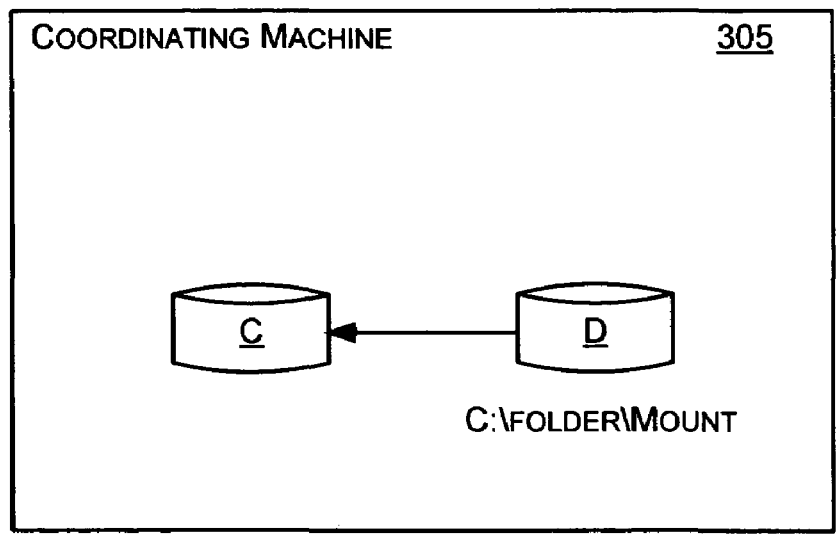
FIG. 3 is a block diagram illustrating a machine that includes two volumes in accordance with various aspects of the invention.

It is important to recognize that a request to add a volume or share to a shadow copy set may cause zero, one, or more volumes to actually be added to the shadow copy set. An example will help to illustrate this aspect. FIG. 3 is a block diagram illustrating a machine that includes two volumes in accordance with various aspects of the invention.

In the configuration shown in FIG. 3, the coordinating machine 305 is the machine upon which the primary coordinator (not shown) executes. Volume D is mounted in a path of volume C (e.g., C:\folder\Mount) such that requests for files in the path are routed to volume D. If a requestor requests that volume C be added to a shadow copy set, one of several things may happen. If C and D are already both part of the shadow copy set, neither volume is added to the shadow copy set (although one or more reference counts may be incremented). If D is already part of the shadow copy set but C is not, C is added to the shadow copy set. If neither C nor D is part of the shadow copy set, both C and D are added to the shadow copy set. When requesting that C be added to the shadow copy set when neither has been added, both C and D need to be added because if only C is added then an error or inconsistency may result when accessing files in the shadow copy set corresponding to C:\folder\Mount (i.e., volume D).

It will be recognized that many volumes may be mounted to C and that the above example may be extended to have multiple other volumes added to a shadow copy set without departing from the spirit or scope of the invention. It will also be recognized that D may have other volumes mounted to it which may have other volumes mounted to them that may also potentially need to be added to the shadow copy set.

Figure 4:
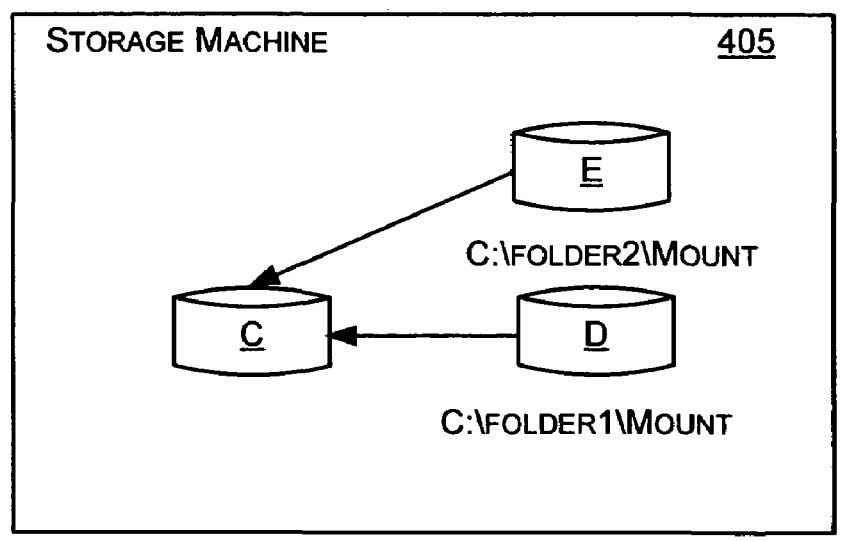
FIG. 4 is a block diagram showing a storage machine that includes three volumes at least one of which is shared via a network share in accordance with various aspects of the invention.

FIG. 4 is a block diagram showing a storage machine that includes three volumes at least one of which is shared via a network share in accordance with various aspects of the invention. A portion of volume C is shared via a network share name of \\Server1\share1 which maps to C:\folder1 of the storage machine 405. In this example, if a requestor requests that volumes associated with \\Server1\share1 be added to a shadow copy set, then several things may happen. First, it should be noted that E will not be added to the shadow copy set as it is mounted in a location not accessible through \\Server1\share1 (i.e., C:\folder2\Mount). Then, volumes C and D may be added to the shadow copy set in accordance with the discussion above in conjunction with FIG. 3.

After creating a shadow copy set including \\Server1\share1, the shadow copy for volume D (e.g., D') may need to be mounted to the shadow copy for C (e.g., C') such that a request for data found in C':\folder1\Mount will be routed to D'. This is sometimes referred to as fixing the mount point. In addition, a new share that maps to C':\folder1 may be created to expose directories and files in C' and D' in the same way that these directories and files were exposed in C and D by the \\Server1\share1 share when the C' and D' were created.

For example, if \\Server1\share1 maps to C:\folder1, a secondary coordinator may create a shadow copy, C' for C:, and create a new share and map it to C':\folder1. Note that C' may be any valid local volume name such as \\?\GLOBALROOT\Device\HarddiskVolume3 and the new share name may include any valid folder name and may include a GUID.

Furthermore, if the volume has a mount point in the namespace that maps to the original share, the secondary coordinator may create a shadow copy for the mounted volume and fix the mount point on the shadow copy volume. In the above example, if C:\folder1\Mount is a mount point to another volume local to the secondary coordinator, the secondary coordinator may create a shadow copy for this volume as well. Assuming that the path for this shadow copy is D', the remote coordinator may fix C':\folder1\mount to point to the D' volume.

In addition, the secondary coordinator may update an entry in a virtual shadow copy database with metadata which corresponds to the virtual shadow copy. The property-set may be different than the property-set of the local volume shadow copy. For example, while the time-stamp of the virtual shadow copy may match the time-stamp of the local shadow copy, the original-volume-name and shadow copy-path may not match. Referring to the example above, the local volume shadow copies may have property-sets such as C and C' as well as D and D' while the virtual share shadow copy may have a property-set including \\Server1\share1 and \\Server1\share1'.

Furthermore, it should be noted that multiple shares may map to one volume. Thus, if a volume has already been added to a shadow copy set as the result of one share, the volume will not need to be added when another network share mapping to the volume is added. Even though the volume is not added to the shadow copy set, as discussed previously, a virtual shadow copy database may be updated to include the name of the share and an indication that the share is associated with a particular volume or set of volumes. A shadow copy referenced on a machine upon which a secondary coordinator executes is sometimes referred to herein as a "virtual shadow copy." In addition, a reference count may be incremented to indicate how many virtual shadow copies reference the actual shadow copy volume that is created.

A name may map to a DFS link in a DFS namespace in which data is distributed throughout various machines. In this case, the primary coordinator may translate the DFS name to a specific network share on a specific machine. Once translated, that share is handled as above. The associated volume is located by the secondary coordinator which makes sure that the volume has not already been added to the shadow copy set previously.

Preparation of Shadow Copy Set

An exemplary process for creating a shadow copy is described below. The requester 220 may initiate a shadow copy set of a set of volumes and/or shares by communicating with the primary coordinator 225. The requestor 220 may do this through the use of a call such as StartSnapShotSet(OUT id). After initiating the shadow copy set, the requestor 220 may send to the primary coordinator 225 a set of volumes and/or shares that are involved in the shadow copy set. Each share may be identified by a UNC path in the form of \\server\share or by a DFS path. Sending the set may be done in one or many calls. In one embodiment, each volume and/or share may be sent via a call such as AddToSnapShotSet(NameOfVolumeOrShare).

The primary coordinator 225 may first become aware that a remote storage device (e.g., storage machine 215) holds data being shadow copied when the requestor 220 adds the name of a remote share to a shadow copy set (e.g., AddToSnapshotSet is called with a share name or with a DFS path instead of a volume name). If a request from the requester 220 is the first share in the shadow copy set for a given storage machine (e.g., storage machine 215), the primary coordinator 225 may instantiate a secondary coordinator on the storage machine 215 using a special interface (e.g., IVssRemoteCoordinator). The primary coordinator 225 may then initialize a set of volumes that are to be shadow copied on the storage machine 215 by calling StartSnapshotSet on the IVssRemoteCoordinator interface of the secondary coordinator. StartSnapshotSet need be called only once for each secondary coordinator involved in the shadow copy set. Determining whether StartSnapshotSet has been called may be accomplished through the use of a database maintained by the primary coordinator between machine names and secondary coordinator instances that tracks whether StartSnapshot set has been called. After StartSnapshot set has been called for a particular secondary coordinator, the primary coordinator 225 may then add volumes associated with the share to the secondary coordinator shadow copy set by calling AddToSnapshotSet on the storage machine 215 and specifying the share name.

If the primary coordinator 225 receives a subsequent request to add another share on the storage machine 215, then the IVssRemoteCoordinator interface should have been already instantiated and the primary coordinator 225 may simply call AddToSnapshotSet on the storage machine 215 with the additional share.

The IVssRemoteCoordinator on the storage machine 215 (e.g., secondary coordinator 240) is responsible for mapping the share to one or more volumes on the storage machine 215 and for determining which provider or providers to use. The secondary coordinator may verify that the share is unique (i.e., has not been added multiple times), and if a volume associated with the share has not yet been included in the current shadow copy set, the secondary coordinator asks one or more local providers to prepare for a shadow copy by calling BeginPrepareSnapshot on the appropriate providers.

In the normal course of events, the requester eventually asks the primary coordinator 225 to create the shadow copy set by calling DoSnapshotSet on the primary coordinator 225's interface. The primary coordinator 225 in turn calls a method (e.g., EndPrepareAllSnapshots) on the one or more secondary coordinators 240 that execute on the one or more storage machines 215. On each storage machine 215, this method prepares each storage machine 215 for taking shadow copies of the volumes on the storage machine 215 that are involved in the shadow copy set by calling a method (e.g., EndPrepareSnapshots) of each provider 245 associated with each shadow copy. This ensures that each provider is ready to quickly create a shadow copy. In addition, if volumes local to the application machine 210 appear in the shadow copy set, the primary coordinator 225 calls EndPrepareSnapshots on each provider 227 participating in the shadow copy set locally.

At this point the steps preparatory to taking a shadow copy set have been completed, and all shadow copy providers on all devices involved are ready to commit the shadow copy in a short time. A timing diagram of an exemplary flow of events that may occur to prepare for a shadow copy set is described below in conjunction with FIG. 7.

Creation of Shadow Copy Set

After preparation for a shadow copy set has occurred, the shadow copy set may be created. First, the primary coordinator may notify all writers on the application server that a shadow copy is about to happen. Once this completes, the primary coordinator calls Freeze on the writers on the application server. This causes the writers to cease writing data to volumes in the shadow copy set (although the writers may continue writing data to memory). At this point, the application data-store is frozen and should be consistent on all machines involved.

The primary coordinator may then instruct each secondary coordinator to create shadow copies of the volumes associated with each secondary coordinator that are involved in the shadow copy set. The secondary coordinators may create shadow copies in parallel and asynchronously from each other. At the same time, the primary coordinator may create shadow copies of any volumes included on the machine upon which the primary coordinator executes that are also involved in the shadow copy set. The primary coordinator then waits, if necessary, until all secondary coordinators have completed their creation of shadow copies. A timing diagram of an exemplary flow of events that may occur to create a shadow copy set is described below in conjunction with FIG. 8.

Post Shadow Copy Creation Activities

After all secondary coordinators have reported that they have finished creating shadow copies, the primary coordinator calls a thaw event on the writers on the application server. This allows the writers to resume writing data to their volumes. The primary coordinator then informs the writers and providers on the application machine that the shadow copy set creation has completed.

Shadow Copy Set by Component

When a shadow copy set is created, various components may perform certain activities as described below:

When a requestor adds a volume or share to the shadow copy set (e.g., using AddToSnapshotSet), the primary coordinator may:

1. Determine whether the added volume or share is a local volume path or a valid remote UNC path and, if the input is a UNC path:

1.1. Check whether the path is a DFS link or not, and:

1.1.1. If the UNC path is a DFS link, make sure that the DFS link has only one target share and obtain the target machine name and share name using DFS APIs; or 1.1.2. If the UNC path is not a DFS link, obtain the remote machine name from the UNC path;

1.2. Check a local database to determine if there is a control path to the remote machine via a secondary coordinator that has already been instantiated and is currently executing on the remote machine.

1.2.1. If the secondary coordinator has not already been instantiated, create a control path to the remote machine by instantiating a secondary coordinator (e.g., by using a shadow copy service running on the remote server) and call StartSnapshotSet on the secondary coordinator; otherwise 1.2.2. If the secondary coordinator has already been instantiated, obtain a pointer to an interface of the secondary coordinator.

1.3. Ask the secondary coordinator to add volumes associated with the share to the shadow copy set; and 1.4 Record in a local database an ID of the shadow copy set and which remote machine or machines are involved in the shadow copy set; otherwise 2. If the input is not a UNC path, but rather a local volume path, add the volume to the primary coordinator shadow volume set.

When asked to add a share, a secondary coordinator may:

1. Find a set of one or more local volumes that map to the share;

2. For each volume so mapped, check whether a previous share (exposed by the machine upon which the secondary coordinator executes) which maps to the volume has already been added to the set;

2.1. If not, then add the appropriate volume to a local set of volumes that will be shadow copied on the machine upon which the secondary coordinator executes;

2.2. If so, increase a reference count that tells how many virtual shadow copies map to one local volume shadow copy; and 3. Create a database entry that includes a set of properties for the virtual shadow copy to local volumes and any other attributes.

When the requester requests that the shadow copies of a shadow copy set be created (e.g., via DoSnapshotSet), 1. The primary coordinator may:

1.1 Communicate to providers that execute on the machine upon which the primary coordinator executes to inform the providers that they should end preparations for taking shadow copies (e.g., via EndPrepareSnapshot( ));

1.2. Inform the secondary coordinator or coordinators that they should tell their associated providers to end preparations for taking shadow copies (e.g., via EndPrepareAllSnapshots( ));

1.3. Prepare and freeze the writers;

1.4. Inform the secondary coordinator or coordinators to begin creating their respective shadow copies;

1.5. Prepare shadow copies of involved volumes that reside on the machine upon which the primary coordinator executes;

1.6. Wait for the secondary coordinators to report that they have finished, if necessary (the secondary coordinators may all finish before the primary coordinator is able to create shadow copies in which case no waiting is necessary); and 1.6. Thaw the writers after all shadow copies are created.

2. Each secondary coordinator may:

2.1. Inform providers associated with the secondary coordinator that the providers should end preparations for creating shadow copies in response to the EndPrepareAllSnapshots call from the primary coordinator;

2.2. Create shadow copies of each volume in the secondary coordinator shadow copy set in response to the request from the primary coordinator;

2.3. Create a share for each share that previously pointed to each volume which was shadow copied, each created share pointing to a location on its associated shadow copy volume that corresponds to where the original share pointed to on the original volume;

2.4. Fix mount points for any shadow copy of a volume that was mounted to the volume pointed to by the original share;

2.5. Update a virtual shadow copy database on the machine upon which the secondary coordinator executes to track the shadow copies created by the secondary coordinator and to map shadow copy set IDs and share names to shadow copies;

2.6. Report to the primary coordinator when the shadow copy process coordinated by the secondary coordinator is finished.

Figure 5:
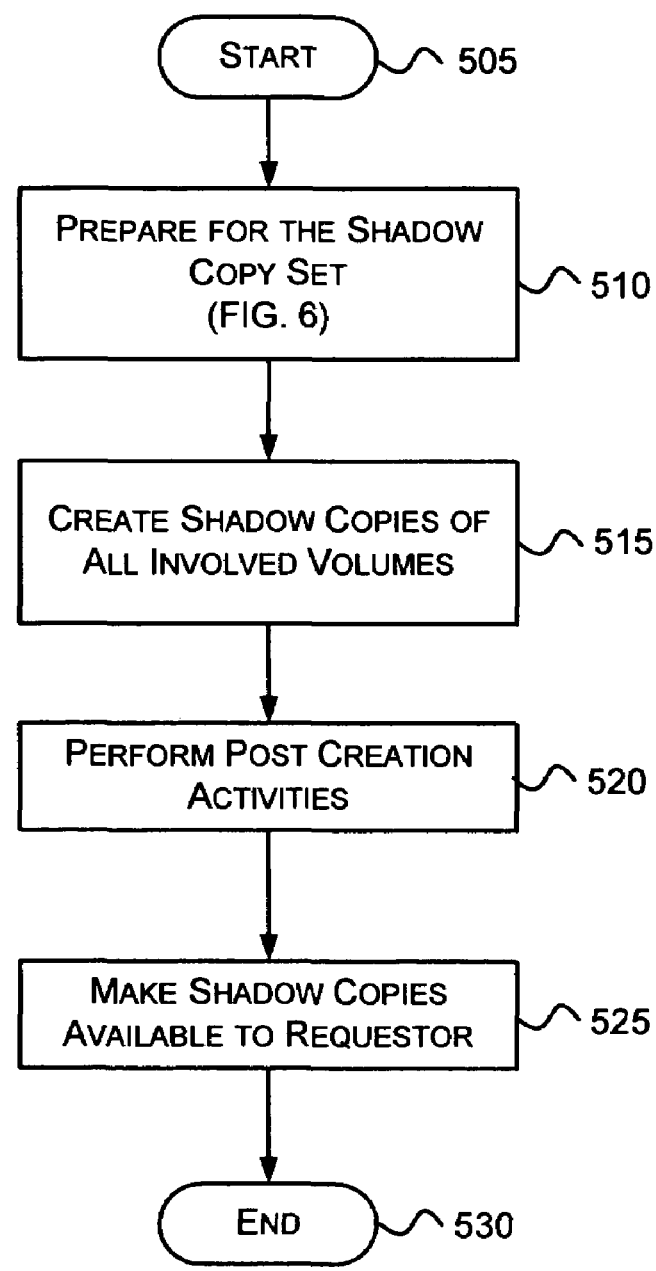
FIGS. 5-6 are flow diagrams that generally represent exemplary steps that may occur in creating a shadow copy set in accordance with various aspects of the invention.
Figure 6:
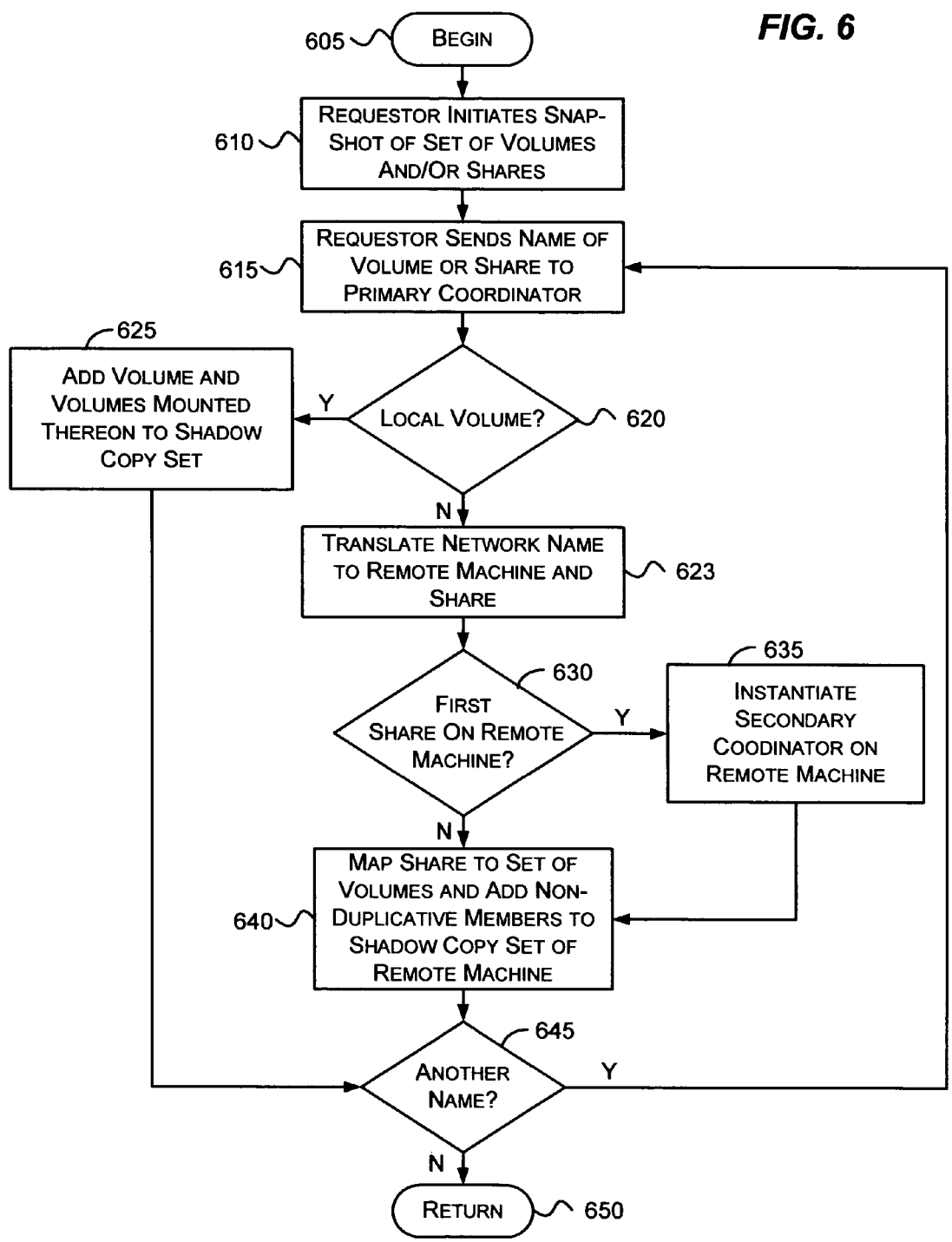

FIGS. 5-6 are flow diagrams that generally represent exemplary steps that may occur in creating a shadow copy set in accordance with various aspects of the invention. The steps involved in these flow diagrams have, in large part, been discussed above but some will be repeated and expanded here to fill in or clarify pertinent details.

Referring to FIG. 5, at block 505, the process begins. At block 510, preparations for creating a shadow copy set are performed as described in further detail in conjunction with FIG. 6. At block 515, shadow copies of all involved copies are created as described previously. At block 520, post shadow copy set creation activities are performed such as thawing writers and fixing mount points as described previously. At block 525, shadow copies of the volumes in the shadow copy set are made available to a requestor.

Referring to FIG. 6, the process is entered at block 605. At block 610, a requester initiates a creation of a shadow copy set. At block 615, the requester sends the name of a volume or share to the primary coordinator. At block 620, a determination is made as to whether the name maps to a volume local to the machine upon which the primary coordinator executes. If the name maps to a local volume, processing branches to block 625. If not, processing branches to block 623.

At block 625, the volume and any volumes that are mounted to the volume are placed in the primary coordinator shadow copy set as described in conjunction with FIG. 3. Note that a volume may be added to the primary coordinator shadow copy set if it is not already included in the primary coordinator shadow copy set. A volume may have been previously added to the primary coordinator shadow copy set because, for example, it may be located by multiple mount points or other local volume names. After the volumes are added, providers for the added volumes are instructed to begin to prepare for a shadow copy of the added volume or volumes as described previously (e.g., via BeginPrepareSnapshot).

At block 623, the network name is translated to a remote machine and share. Such translation may involve determining whether the share is a DFS link or not. This may be done by determining whether the name is a valid UNC path that maps to a remote machine. If the name maps to a UNC path of a remote machine, the primary coordinator may then determine if the name is a DFS link. If the name is a DFS link, the primary coordinator may obtain a target machine's name and share using DFS APIs. If the name is not a DFS link, the primary coordinator may obtain the name of the remote machine and share via the UNC path.

At block 630, a determination is made as to whether the name is the first share for the remote machine. If so, processing branches to block 635 where a secondary coordinator is instantiated on the remote machine and the secondary coordinator is instructed to start a shadow copy set (e.g., via StartSnapshotSet(IN id)). When the secondary coordinator is instantiated, the primary coordinator needs to retain the interface pointer for future communication with the secondary coordinator. Furthermore, the id passed to the secondary coordinator is used to identify the shadow copy set.

At block 640 the share name is passed to the secondary coordinator. The secondary coordinator maps the share to a set of one or more volumes and adds all non-duplicative members of the set (i.e., members that are not already included in the secondary coordinator shadow copy set) to the secondary coordinator shadow copy set. As mentioned previously, a share may map to one or more volumes depending on if the share may be used to reach other volumes that are mounted to the volume.

If during block 640 a secondary coordinator determines that a volume is duplicative of a volume already in the shadow copy set of the secondary coordinator, a reference counter associated with the volume may be incremented. The reference counter may be used in tracking how many virtual shadow copies point to the shadow copy and in deleting the shadow copy as described in more detail below. If the volume is not duplicative, the secondary coordinator adds the volume to its shadow copy set and calls BeginPrepareSnapshots on the appropriate providers.

At block 645, if the requestor desires to send another name to add to the shadow copy set, processing continues at block 615; otherwise, processing continues at block 650, which then returns to the calling process.

The process shown in FIG. 6 continues until all volumes corresponding to all requested names have been added to the shadow copy set. After a volume or volumes corresponding to a name have been added to a shadow copy set, calls may be made to one or more providers associated with the volume or volumes to notify and prepare the providers for the upcoming shadow copy set creation. After all volumes corresponding to all requested names have been added the process continues at block 515 of FIG. 5.

Figure 7:
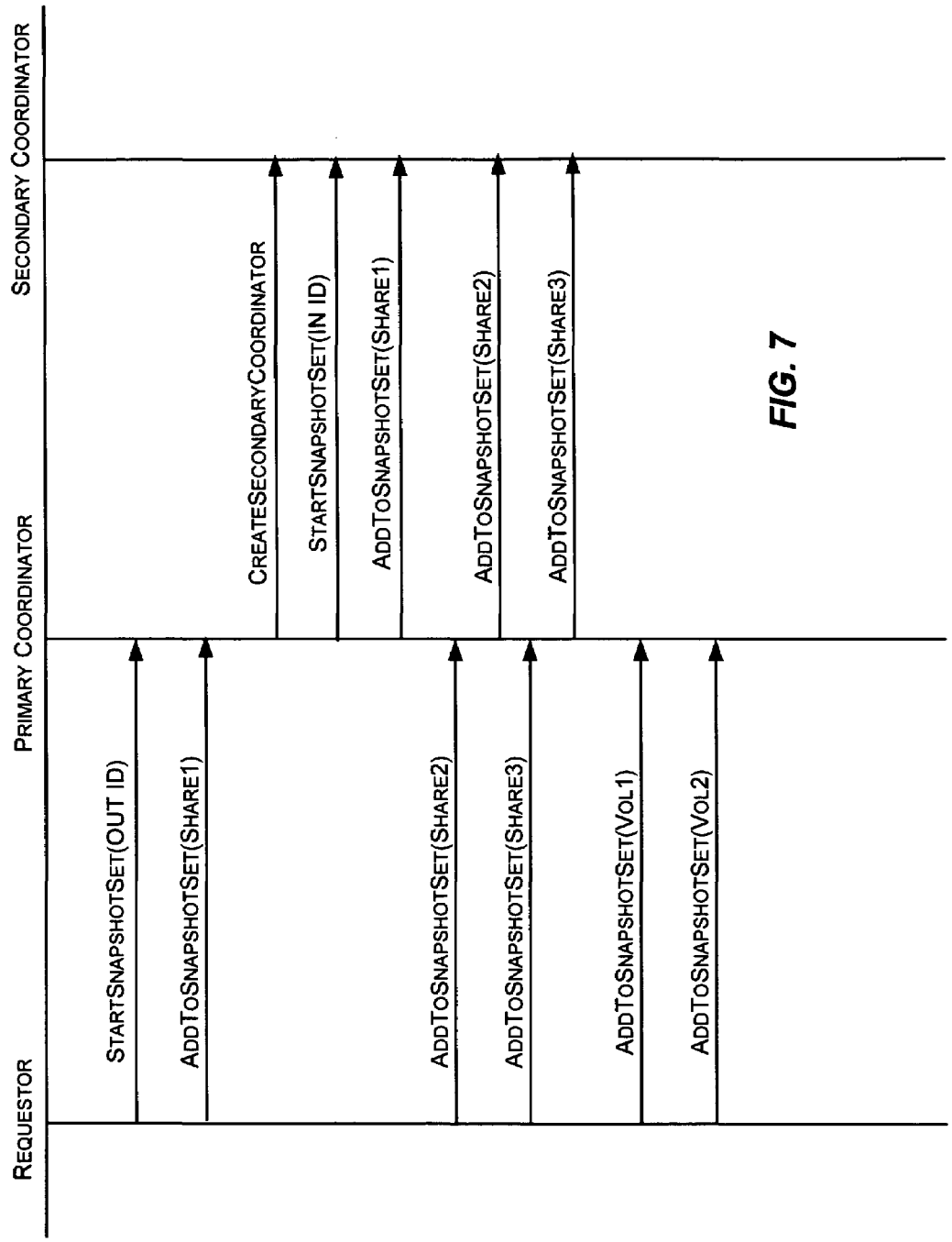
FIG. 7 is a timing diagram that illustrates an exemplary low of events that may occur to prepare for a shadow copy set in accordance with various aspects of the invention.

FIG. 7 is a timing diagram that illustrates an exemplary flow of events that may occur to prepare for a shadow copy set in accordance with various aspects of the invention. First, a requester sends a request to start a shadow copy set (e.g., StartSnapShotSet(OUT id)). Then, the requester adds a share to the shadow copy set wherein the share maps to a remote machine (e.g., AddToSnapShotSet(Share1)). As the primary coordinator recognizes that this share maps to a remote machine, the primary coordinator may create a secondary coordinator on the remote machine, start a shadow copy set via the secondary coordinator, and add the share. The requester then adds two more shares (e.g., share2 and share3) to the shadow copy set. The primary coordinator instructs the secondary coordinator to add the volumes associated with these shares to the secondary coordinator shadow copy set. If these shares point to the same volume (or set of volumes) pointed to by share1, then no volumes may be added to the secondary coordinator shadow copy set although virtual shadow copies are created for each such share.

After adding share2 and share3, the requester adds vol1 and vol2. Vol1 and vol2 are located on the machine upon which the primary coordinator executes and hence the primary coordinator does not need to communicate these volumes to the secondary coordinator. Although not shown on the timing diagram, after each volume is added (on either the primary coordinator or the secondary coordinator), the shadow copy provider associated with the volume may be instructed to prepare for a shadow copy. Note that the shadow copy provider is instructed to prepare a shadow copy for each added volume exactly once even if the same volume is added multiple times to the snapshot set by the requestor.

Figure 8:
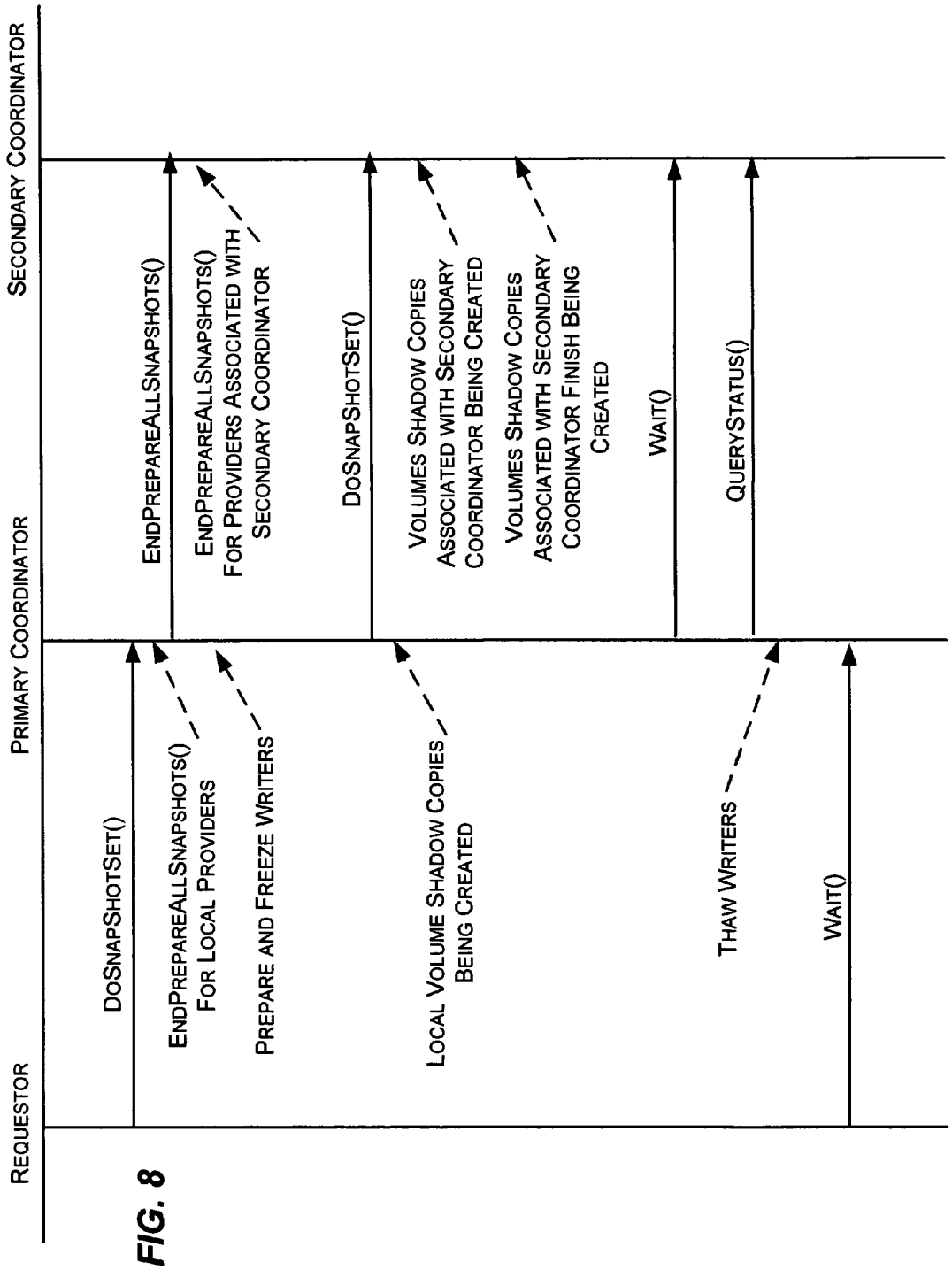
FIG. 8 is a timing diagram that illustrates an exemplary flow of events that may occur to prepare for the creation of shadow copies of volumes included in a shadow copy set in accordance with various aspects of the invention.

FIG. 8 is a timing diagram that illustrates an exemplary flow of events that may occur to prepare for the creation of shadow copies of volumes included in a shadow copy set in accordance with various aspects of the invention. First, the requestor requests that the shadow copy volumes in the shadow copy set be created (e.g., DoSnapShotSet( )). The primary coordinator notifies all secondary coordinators that they should end preparation for all secondary coordinator shadow copy sets associated with the secondary coordinators. The primary coordinator also notifies local providers of volumes included in the primary coordinator shadow copy set that they should end preparation for creating shadow copies. Then, the primary coordinator prepares and freezes all writers on the same machine as the primary coordinator. The primary controller then tells all secondary coordinators that they should now perform their shadow copies (e.g., DoSnapShotSet( )). The primary and secondary coordinators work on creating shadow volume copies in parallel and asynchronously from each other. The primary coordinator may begin creating shadow copies of volumes on the machine upon which the primary coordinator executes as soon as all writers are frozen (e.g., in parallel with telling the secondary coordinators that they should now perform their shadow copies.) At some time, all of the secondary coordinators and the primary coordinator finish creating shadow copies. The primary coordinator waits, if necessary, until all shadow copies are created by the secondary coordinators. After the shadow copies are created, the primary coordinator may query the status of the secondary coordinators (e.g., QueryStatus( )) to determine if any errors have occurred. Afterwards, the primary coordinator thaws the writers.

Because the request to create a shadow copy set may execute asynchronously with respect to the requester, the requestor may perform other operations while it waits until the operation completes.

FIGS. 9-10 are block diagrams that generally represent configurations that may occur before and after an exemplary creation of shadow copies of volumes included in a shadow copy set in accordance with various aspects of the invention. Referring to FIG. 9, a requestor (not shown) desires to create a shadow copy set including volume C of an application machine 905 and shares that map to volumes on remote machines 910-911. With reference to the shares for the remote machine 910, the requestor desires to create a shadow copy set that includes any volumes associated with \\server1\share1, which maps to C:\folder1 of volume C of the remote machine 910. Volume Vol2 of the remote machine 910 mounts to folder C:\folder1\Mount of volume C of the remote machine 910. In addition, the requestor desires the shadow copy set to include any volumes associated with shares \\server2\share1, \\server2\share2, and \\server2\share3 which map to C:\folder1, C:\folder2, and C:\folder3, respectively, of volume C of the remote machine 911.

Referring to FIG. 10, through the process described previously, shadow copies of appropriate volumes are created and shares are mapped to these volumes to provide access to the data. Note that \\server1\snapshare1 maps to folder \folder1 of a shadow copy of volume C of the remote machine 910 and that \\server2\snapshare1, \\server2\snapshare2, and \\server2\snapshare3 map to folders \folder1, \folder2, and \folder3, respectively, of a shadow copy of volume C of the remote machine 911. Note also that a shadow copy of volume Vol2 of the remote machine 910 has been created and mounted to folder \folder1\Mount of a shadow copy of volume C.

Query and Get Properties

A requestor may query a primary coordinator for all existing shadow copies. Because information regarding a shadow copy set may be maintained by the primary coordinator and one or more secondary coordinators, the primary coordinator may obtain information to satisfy a query by communicating with one or more secondary coordinators. A virtual shadow copy database on each secondary coordinator may include the following:
Shadow copy set id,
Shadow copy id,
Source share,
Source volumes,
Target shadow copy ids,
Target share pointing into shadow copy.

Furthermore, a secondary coordinator may include a local shadow copy database regarding each shadow copy created by the secondary coordinator including the following:
Shadow copy set id,
Original volume,
Shadow copy id,
Target shadow copy device name,
Reference count.

In addition, a primary coordinator may include a remote shadow copy database including the following:
Shadow copy set id,
Remote machine,
Source share,
Shadow copy id,
Reference to secondary coordinator instance.

In obtaining information to satisfy a query for all existing shadow copies, the following actions may occur:

1. The primary coordinator may look in its remote shadow copy database to retrieve data regarding all recorded shadow copy sets;

2. For every unique machine in the database, the primary coordinator may create a control path by creating a secondary coordinator on each referenced remote machine and calling Query on each secondary coordinator interface;

3. Each secondary coordinator may return a list of all shadow copies sets it has created for the primary coordinator by enumerating them from its virtual shadow copy database; and 4. The primary coordinator may then concatenate the query results from all secondary coordinators to a list of shadow copies created for the machine on which the primary coordinator executes and return the concatenated list to the requester.

When a requestor queries a primary coordinator for a specific shadow copy based on a shadow copy ID, the following actions may occur:

The primary coordinator may first look for the shadow copy on the machine upon which the primary coordinator executes. If the primary coordinator finds the shadow copy on the machine upon which the primary coordinator executes, the primary coordinator may then return requested information to the requestor; otherwise, the following actions may occur:

1. The primary coordinator may look in its remote shadow copy set database for an entry corresponding to the requested shadow copy. If the primary coordinator finds a reference to the shadow copy in its remote shadow copy set database, the primary coordinator may then create a control path by creating a secondary coordinator on the remote machine upon which the shadow copy was created and querying the secondary coordinator for shadow copy properties.

2. The secondary coordinator may then look for the shadow copy in its virtual shadow copy database and determine whether the corresponding shadow copy still exists.

2.1. If the shadow copy still exists, the secondary coordinator may then return the properties associated with it to the primary coordinator which may then return them to the requestor.

2.2. If the shadow copy was deleted (possible, due to resource issues), the secondary coordinator updates its virtual shadow copy database and returns a not-found error to the primary coordinator. The primary coordinator then updates its own database and returns a not-found error to the requester.

Shadow Copy Deletion

A requestor may ask a primary coordinator to delete a specific shadow copy. In doing so the following actions may occur:

The primary coordinator looks for the shadow copy on the machine upon which the primary coordinator executes. If the primary coordinator finds the shadow copy there, the primary coordinator deletes the shadow copy; otherwise, the following actions may occur:

1. The primary coordinator looks in its remote shadow copy set database for an entry corresponding to the shadow copy. If the primary coordinator finds the entry, the primary coordinator creates a control path by creating a secondary coordinator on the remote machine found in the entry and then calls Delete on the secondary coordinator interface.

2. The secondary coordinator looks for the shadow copy in its virtual shadow copy database. The virtual shadow copy database refers to one or more local volumes and shadow copies. For each shadow copy, the secondary coordinator:

2.1. Looks in its shadow copy database for the shadow copy and decrements its reference count by 1.

2.2. If the reference count is zero, the shadow copy is deleted.

3. Whatever the reference count is, the secondary coordinator erases the virtual shadow copy entry from its database.

4. The primary coordinator erases the entry from its remote shadow copy set database as well.

Requestor

As indicated previously, a requester may execute on a machine and be collocated on that machine with another shadow copy participant or it may execute on a machine and not be collocated with another shadow copy participant.

In one embodiment of the invention, a requester may execute on a machine on a SAN where the backup is performed. That machine is separate from the machine hosting the data to be backed up. The requestor may create a transportable shadow copy (e.g., a shadow copy that may be moved to any machine on the SAN by SAN reconfiguration) on the machine hosting the data. In this environment:

1. The server which executes the remote requester may request a remote shadow copy creation on the machine that hosts the application (e.g., an application server).

2. The application server may then coordinate with the machine hosting the data (as described above) to physically create the snapshot using a hardware shadow copy provider. The primary coordinator and hardware provider on the machine hosting the data may then create and export the transportable shadow copies.

3. After the shadow copy set has been created, the requester may then import the shadow copies (e.g., to perform a backup) using another coordinator object.

While there are several different ways to implement the remote requester functionality, one embodiment of the invention uses a single coordination point on the application server to talk to the writers. In this embodiment, a separate set of internal coordinator objects/interfaces may be used that are different from the standard IVssCoordinator/IVssWriter interfaces used in other embodiments. The remote requestor code may use this interface to talk to a centralized coordinator (e.g., a primary coordinator) executing on the machine hosting the application or applications for which a shadow copy set is desired (e.g., for a backup). This centralized coordinator communicates with the individual writers on that machine. This reduces the number of calls between the requestor and the application machine since there is a single call to a centralized coordinator for each step in the process rather than a call to each writer for each step.

While this document has sometimes referred to network shares and DFS links to identify data on remote machines, it will be readily recognized that the principles described herein are equally applicable to any other name that can be resolved to a machine and a folder or volume on that machine. Network names such as symbolic links, NFS paths, WEBDAV shares, other network names, and the like may be used to create virtual shadow copies in accordance with various aspects of the invention without departing from the spirit or scope of the invention.

As can be seen from the foregoing detailed description, there is provided a framework for taking shadow copies and performing backups in a networked environment. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system for creating shadow copies, comprising:
   a requestor arranged to send a request to create a shadow copy set that includes a set of volumes;
   a primary coordinator arranged to receive the request and to coordinate shadow copies of the volumes;
   the primary coordinator enabled to determine if a volume in the set of volumes has volumes mounted to it which need to be included in the shadow copy set;
   the primary coordinator enabled to determine if all volumes are included in the shadow copy set and to include all volumes in the shadow copy set;
   the primary coordinator enabled to prepare and freeze all writers associated with all volumes included in the shadow copy set;
   the primary coordinator enabled to thaw the writers associated with all volumes included in the shadow copy set after all shadow copies have been created; and
   a secondary coordinator arranged to communicate with the primary coordinator and to create shadow copies of a subset of the set of volumes of the shadow copy set.

2. The system of claim 1, wherein shadow copy participants comprise the requestor, the primary coordinator, and the secondary coordinator and wherein at least one of the shadow copy participants executes on a machine other than a machine upon which other shadow copy participants execute.

3. The system of claim 1, wherein the primary coordinator executes on a first machine that includes at least one of the volumes and the secondary coordinator executes on a second machine that includes at least one other of the volumes.

4. The system of claim 3, wherein in coordinating shadow copies of the volumes, the primary coordinator creates a shadow copy of the at least one of the volumes on the first machine and wherein the secondary coordinator creates a shadow copy of the at least one other of the volumes on the second machine.

5. The system of claim 1, wherein the requestor and the secondary coordinator execute on a first machine upon which an application stores most of its data and wherein the primary coordinator executes on a second machine upon which the application executes and wherein the requestor is part of a backup application that backs up the application's data on the first machine.

6. The system of claim 1, wherein the primary coordinator is further arranged to maintain a mapping from a name associated with a set of one or more volumes in the shadow copy set to a machine.

7. The system of claim 6, wherein the secondary coordinator maintains a mapping from the name to a set of one or more shadow copies that correspond to the set of one or more volumes, wherein the set of one or more shadow copies is maintained on the machine.

8. The system of claim 6, wherein the secondary coordinator includes a reference count that indicates how many names are associated with a particular shadow copy.

9. The system of claim 6, wherein the reference count is decremented when the secondary coordinator receives a particular name together with a delete instruction.

10. The system of claim 9, wherein after sending the particular name, the particular shadow copy is no longer accessible via the particular name.

11. The system of claim 9, wherein the particular shadow copy is deleted when all names associated with the particular shadow copy are received together with delete instructions as indicated by the reference count.

12. A method for creating shadow copies of volumes within a computing environment, comprising:
   receiving a name associated with a volume;
   determining a machine upon which the volume resides;
   determining whether the volume is already included in a shadow copy set;
   determining if the volume has other volumes mounted to it which need to be added to the shadow copy set;
   freezing the writers associated with the volumes included in the shadow copy set;
   creating shadow copies of all volumes included in the shadow copy set, wherein a shadow copy comprises a duplicate of its associated volume at a particular time; and
   after having created all the shadow copies, thawing the writers previously frozen.

13. The method of claim 12, wherein the duplicate is logical.

14. The method of claim 12, wherein the duplicate is physical.

15. The method of claim 12, wherein the shadow copy set includes volumes that are located on different machines.

16. The method of claim 12, further comprising adding the volume to the shadow copy set if the volume is not already included in the shadow copy set.

17. The method of claim 12, further comprising storing a machine name of the machine and the name associated with the volume in a database.

18. The method of claim 17, further comprising receiving a request for information regarding a particular shadow copy, the request including the name associated with the volume and obtaining the machine name via the database.

19. The method of claim 18, further comprising sending another request to the machine having the machine name and obtaining information regarding the shadow copy therefrom.

20. A computer-readable storage medium having computer-executable instructions which, when executed, perform a method comprising:
  receiving a request to add a volume associated with a name to a shadow copy set;
  determining whether the volume is located locally or remotely;
  determining whether the volume is already included in the shadow copy set;
  upon determining the volume is not already included in the shadow copy set, adding the volume to the shadow copy set;
  determining if the volume has other volumes mounted to it which need to be added to the shadow copy set;
  preparing and freezing writers associated with the volumes included in the shadow copy set;
  creating shadow copies of all volumes included in the shadow copy set, wherein a shadow copy comprises a logical duplicate of its associated volume at a particular time; and
  after all shadow copies have been created, thawing the writers previously frozen.

21. The computer-readable medium of claim 20, wherein the name identifies data on a network.

22. The computer-readable medium of claim 21, wherein the name comprises a universal naming convention (UNC) name.

23. The computer-readable medium of claim 21, wherein the name includes a path that maps to a distributed file system (DFS).

24. The computer-readable medium of claim 23, further comprising identifying a target machine of the distributed file system to create shadow copies of any volumes in the shadow copy set that are associated with the name.

25. The computer-readable medium of claim 21, wherein the name comprises a symbolic link, a network file system (NFS) path, or a WEBDAV share.

26. The computer-readable medium of claim 21, wherein the name comprises a network share name.

27. The computer-readable medium of claim 21, further comprising creating a share referencing a shadow copy created of a volume on a remote machine.

28. The computer-readable medium of claim 20, wherein the name comprises a volume name that indicates that the volume is located locally.

29. The computer-readable medium of claim 20, further comprising determining whether any other volume or volumes are associated with the name.

30. The computer-readable medium of claim 29, wherein determining whether any other volume or volumes are associated with the name comprises determining whether the other volume or volumes are mounted to the volume in a manner accessible via the name.

31. The computer-readable medium of claim 29, further comprising determining whether the other volume or volumes are already included in the shadow copy set.

32. The computer-readable medium of claim 31, further comprising adding the other volume or volumes into the shadow copy set if the other volume or volumes are not already included in the shadow copy set.

33. The computer-readable medium of claim 29, wherein the request is sent from a first machine and received on a second machine and wherein at least one of the volumes in the shadow copy set resides on a third machine.

34. The computer-readable medium of claim 20, wherein one of the volumes of the shadow copy set is located on a machine upon which an application executes and another of the volumes of the shadow copy set is located on a machine other than the machine upon which the application executes, wherein the application includes a data store that is spread throughout the volumes included in the shadow copy set.

35. The computer-readable medium of claim 20, wherein the shadow copy set includes a first volume that is mounted to a second volume in the shadow copy set.

36. The computer-readable medium of claim 35, further comprising fixing a shadow copy of the first volume to mount to a shadow copy of the second volume at a path corresponding to where the first volume mounts to the second volume.

37. A computer-readable storage medium having encoded thereon computer-executable instructions which, when executed, perform a method comprising:
  receiving a request to add a volume associated with a name to a shadow copy set;
  determining if the volume is included in the shadow copy set;
  when not included in the shadow copy set, adding the volume to the shadow copy set;
  determining if the volume has other volumes mounted to it which need to be added to the shadow copy set;
  when the volume has volumes mounted to it which need to be added to the shadow copy set, adding the volumes mounted to it to the shadow copy set;
  freezing writers associated with the volumes in the shadow copy set;
  creating shadow copies of all volumes included in the shadow copy set, wherein a shadow copy comprises a logical duplicate of its associated volume at a particular time, and wherein creating the shadow copies occurs on a machine other than a machine which sent the request; and
  after all the shadow copies have been made, thawing the writers having previously been frozen.

38. The computer-readable medium of claim 37, wherein the request is received at a first machine upon which an application stores most of its data, and wherein the request is received from a backup application that executes on a second machine and that backs up the application's data on the second machine.

* * * * *